United States Patent [19]

Katoh

[11] 4,292,354
[45] Sep. 29, 1981

[54] MOLDINGS FOR AUTOMOBILES

[75] Inventor: Hisanori Katoh, Tokyo, Japan

[73] Assignee: Inoue Gomu Kogyo Kabushiki Kaisha, Aichi, Japan

[21] Appl. No.: 944,306

[22] Filed: Sep. 21, 1978

[30] Foreign Application Priority Data

Mar. 31, 1978 [JP] Japan .................. 53/42503[U]

[51] Int. Cl.³ .................. B32B 15/08; B60R 13/02
[52] U.S. Cl. .................. 428/31; 52/716; 428/122; 428/332; 428/412; 428/462
[58] Field of Search .......... 428/31, 457, 461, 462, 428/122, 332, 412; 52/716

[56] References Cited

U.S. PATENT DOCUMENTS

| | | | |
|---|---|---|---|
| 3,226,287 | 12/1965 | Shanok et al. | 428/31 X |
| 3,440,129 | 4/1969 | Anselm | 428/31 X |
| 3,515,615 | 6/1970 | Okada et al. | 156/272 |
| 3,538,055 | 11/1970 | Camilleri et al. | 428/424 |
| 3,547,515 | 12/1970 | Shanok et al. | 428/31 X |
| 3,547,516 | 12/1970 | Shanok et al. | 428/31 X |
| 3,590,768 | 7/1971 | Shanok et al. | 428/31 X |
| 3,616,099 | 10/1971 | Shanok et al. | 428/31 X |
| 3,681,180 | 8/1972 | Kent | 428/31 X |
| 3,687,794 | 8/1972 | Shanok et al. | 428/31 |
| 3,720,567 | 3/1973 | Shanok et al. | 428/379 X |
| 3,811,989 | 5/1974 | Hearn | 428/31 X |
| 3,911,178 | 10/1975 | McDowell et al. | 428/31 X |
| 4,139,664 | 2/1979 | Wenrick | 428/31 |

*Primary Examiner*—Henry F. Epstein
*Attorney, Agent, or Firm*—Armstrong, Nikaido, Marmelstein & Kubovcik

[57] ABSTRACT

A molding for an automobile characterized in that a stainless foil layer is integrated with the surface side of a molding base or substrate of synthetic resin and an oil-proof protective layer is integrated with the backside of said base, i.e., the side which is attached to the car body, whereby a solvent used to remove a wax coating on a car body can be prevented from contacting said base or substrate, to avoid cracking of said base as well as a crimping of said stainless foil layer.

12 Claims, 6 Drawing Figures

MOLDINGS FOR AUTOMOBILES

BACKGROUND OF THE INVENTION

Recently the fringes on the roof, window, door, fender, front grille, trunk and bonnet of an automobile and the side surfaces of a car body have been decorated with various moldings; among others, one with a hardened synthetic resin base or substrate, characterized by metallic luster, lightness and heat resistance, on the top side of which a stainless foil layer is integrated, is popular. Meanwhile, it is the conventional practice in auto manufacturing to apply a wax coating on the outside surface of a car body to protect it upon completion of its assembly and wipe off this coat just before delivery to the end user with a wax remover or a lamp oil. As a result, the solvent causes said synthetic resin molding base to crack ("solvent crack") and the stainless foil layer, i.e., the decorative surface of the molding is often crimped. Similar cracking is also caused by a surface active agent which has been applied for window glass cleaning.

SUMMARY OF THE INVENTION

The present invention relates to a molding for automobiles, and, more particularly, to an improvement of a molding in which a stainless foil layer is integrally applied to the surface side of a molding base or a substrate for automobiles, especially one made of synthetic resin.

It is the object of the present invention to provide a molding for automobiles which is resistant to the attack of solvents employed for wiping off the wax from a car body and thus free from the conventional defects of auto-molding.

The object of the present invention can be obtained by forming an oil-proof protective layer on the backside of the molding base or substrate, i.e., the side which faces the car body.

DETAILED DESCRIPTION OF THE INVENTION

Figure 1:
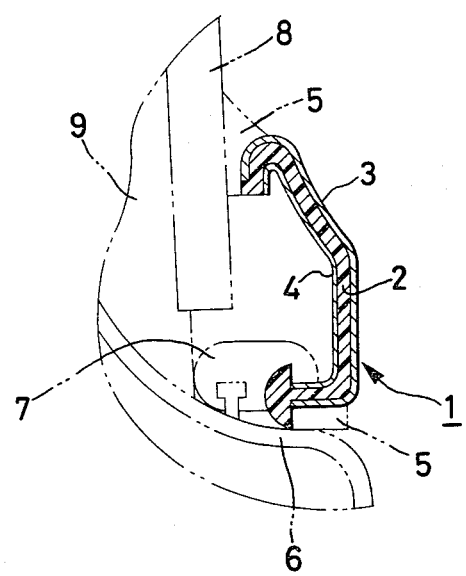
FIG. 1 shows a sectional view of a window molding for an automobile used in a direct-glazing system as an embodiment of the present invention.

In FIG. 1 illustrates a window molding for an automobile used in a direct-glazing system as an embodiment of the present invention, the molding 1, which is a slender piece extending in a normal direction to the paper surface, consists of a synthetic resin base or substrate 2, a stainless foil layer 3 integrally applied to the surface side of said base or substrate 2 by, for example, bonding, and an oil-proof protective layer 4 integrally formed on the backside of said base 2, and, depending on the necessity, said stainless foil layer 3 is coated with a thin film of clear synthetic resin, for instance, vinyl chloride resin, cellulose acetate-butyrate resin, etc.

Synthetic resin, to constitute said base or substrate 2, is selected from among heat-resistant hardened resins such as ABS resin, polycarbonate resin and the like. Said stainless foil layer 3 has a thickness of from 50 to 200 μ. Said protective layer 4, being formed to prevent "solvent crack" due to the contact of said base 2 with a solvent, is required to be oil-proof. In addition, it is desirably heat-resistant and adequately flexible. A protective layer 4 meeting such requirements can be obtained by coating the backside of the base 2 with, for example, urethane paint, by extrusion coating a thermoplastic synthetic resin such as soft polyvinyl chloride, cellulose acetate, cellulose butyrate, cellulose acetate-butyrate and the like together with the base 2, or by applying a metallic foil like aluminum foil which is characterized by high ductility and malleability. Use of a synthetic resin paint for coating has the merit of being able to easily follow the bending of the base 2.

It is not always necessary for the protective layer 4 to cover the whole surface of the backside of the base 2. Said layer 4 has only to be formed on the backside corresponding to the part externally visible when attached to the car body, of the stainless foil layer 3 on the top.

In the molding 1, as illustrated in FIG. 1, one end (lower end in the figure) bent backward to contact the car body 6 through the elastic piece 5 is fastened to a plating portion of said car body 6 by means of a clip 7, while the other end is made to bear against the window 8 through said elastic piece 5. In the figure, reference numeral 9 represents a layer of the bonding agent which fixes the window 8 to the car body 6.

Figure 2:
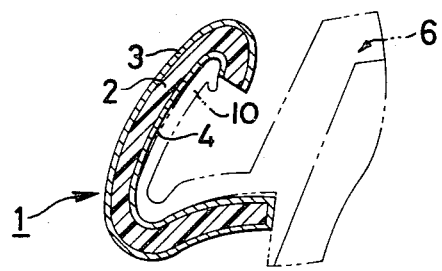
FIG. 2 shows a sectional view of a roof drip molding as an embodiment of the present invention.

FIG. 2 shows a sectional view of a molding 1 attached by a fitting means to the automobile roof drip channel 10. In this molding 1 with a section approximately formed like a letter C, a stainless foil layer 3 is applied to the surface side (external side) and a protective layer 4 is formed on the backside (internal side) of the molding 1. In this embodiment of the present invention, a stainless foil covers the whole base 2, thereby integrally forming the stainless foil layer 3 and the protective layer 4.

Figure 3:
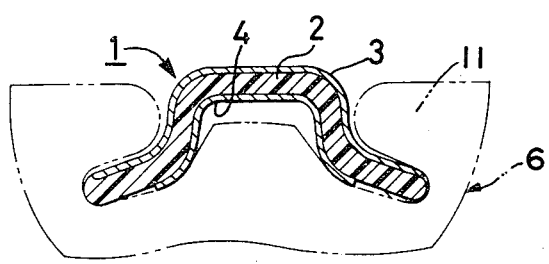
FIGS. 3 and 4 show sectional views respectively of moldings for weather stripping as embodiments of the present invention.

FIG. 3 illustrates a (omega)-section molding 1 as attached to a standard H-shaped weather strip 11 (a portion of which is shown in dashed lines) made of rubber on the car body 6; beneath weather strip 11 there is formed no protective layer 4.

Figure 4:
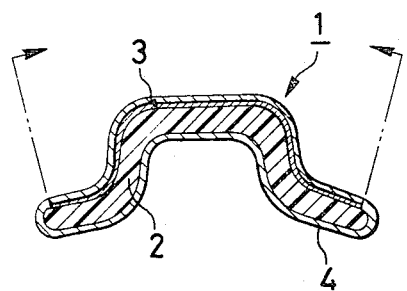

FIG. 4 illustrates a molding 1 as attached similarly to the weather strip 11 of FIG. 3. In this case, after the whole surface including the stainless foil layer 3 is covered with thermoplastic synthetic resin which constitutes the protective layer 4, the protective layer 4 (arrow portion shown in one-dot-chain line portion in the figure) of the stainless foil layer 3 on the surface is peeled off for use. If thereby the protective layer 4 is formed with a clear synthetic resin, the whole thing can be attached to the car body 6 without peeling off the protective layer 4 of the stainless foil layer 3.

Figure 5:
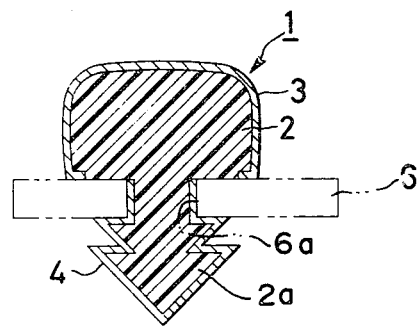
FIGS. 5 and 6 show sectional views of other moldings as embodiments of the present invention.

FIG. 5 illustrates a case of using a fitting projection 2a on the molding 1 which is provided on the backside of the base 2 and which is fitted into a hole 6a in the car body 6, the protective layer 4 being formed around said projection 2a.

Figure 6:
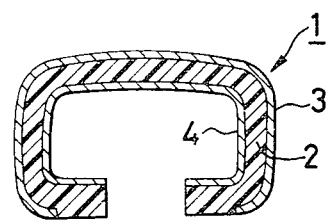

FIG. 6 illustrates a molding 1 to be attached around the bonnet of car body by a fitting means (not shown), the protective layer 4 being formed on the internal side of the base 2.

As described above, the synthetic resin molding for automobiles according to the present invention, in which the vital part on the backside of the molding base is protected with an oil-proof layer, is free from the likelihood of developing a "solvent crack" even when there is applied thereto a solvent such as a wax removing agent or a surface active agent and, therefore, avoiding the result of having the decorative effect of the stainless foil being spoiled thereby.

What is claimed is:

1. A molding for automobiles comprising:
   a base made of synthetic resin;
   a stainless foil layer integrally formed on the outer surface of said base, and
   oil proof protective layer means selected from the group consisting of polyvinyl chloride resin, cellulose acetate resin, cellulose butyrate resin and cellulose acetate-butyrate resin, integrally formed on the backside of said base for preventing solvent from contacting the backside of said base, wherein the thickness of said base is greater than the thickness of said foil layer or said protective layer means.

2. The molding of claim 1, wherein said base is made of a heat-resistant hardened synthetic resin.

3. The molding of claim 2, wherein said heat-resistant synthetic resin is acrylonitrile-butadiene-styrene resin or polycarbonate resin.

4. The molding of claim 1, wherein said stainless foil layer has a thickness of from 50 to 200μ.

5. The molding of claim 1, including a thin film of clear synthetic resin on the surface of said stainless foil layer.

6. The molding of claim 5, wherein the synthetic resin is vinyl chloride resin or cellulose acetate-butyrate resin.

7. The molding of claim 1, wherein said protective layer means is an oil-proof, heat-resistant and flexible synthetic resin.

8. The molding of claim 1 wherein said oil-proof protective layer means covers the entire surface of said base and said stainless foil layer.

9. The molding of claim 8 wherein said oil-proof protective layer means is clear.

10. The molding of claim 1, wherein the cross-sectional form of the molding consisting of said base, stainless foil layer and protective layer means has the shape of a letter C.

11. The molding of claim 1, including a projection means, which fits into a hole of a car body, on the backside of said base wherein said projection means is surrounded with said protective layer means and wherein said protective layer means is an oil-proof synthetic resin.

12. The molding of claim 1, wherein the cross-sectional form of the molding consisting of said base, stainless foil layer and protective layer means has an omega shape.

* * * * *